United States Patent [19]

Kitagawa

[11] Patent Number: 4,467,881

[45] Date of Patent: Aug. 28, 1984

[54] SPAN ADJUSTING DEVICE IN AUTOMATIC WEIGHING MACHINE

[75] Inventor: Kazumi Kitagawa, Shiga, Japan

[73] Assignee: Kabushiki Kaisha Ishida Koki Seisakusho, Kyoto, Japan

[21] Appl. No.: 421,422

[22] Filed: Sep. 22, 1982

[30] Foreign Application Priority Data

Sep. 24, 1981 [JP] Japan ............................ 56-142241[U]

[51] Int. Cl.³ ...................... G01G 19/00; G01G 23/01; G01G 23/14
[52] U.S. Cl. ........................................ 177/50; 177/58; 177/146; 177/164
[58] Field of Search ................... 177/50, 146, 164, 58; 73/1 B

[56] References Cited

U.S. PATENT DOCUMENTS 3,156,311 11/1964 Olofsson et al. .................. 177/58 X
3,194,050 7/1965 Ruge ..................................... 73/1 B Primary Examiner—E. A. Goldberg
Assistant Examiner—Patrick W. Foster
Attorney, Agent, or Firm—Staas & Halsey

[57] ABSTRACT

Disclosed in a span adjusting device for an automatic weighing apparatus of the type in which the load of a weighing hopper containing articles to be weighed is applied to a corresponding weighing mechanism through means of a support member adapted for supporting the weighing hopper, and in which the weight is derived as the magnitude of the output signal from a displacement sensor provided on the weighing mechanism. The span adjusting device comprises a reference weight rest which is secured to the support member and on which a reference weight may be placed so that the span weight of the reference weight is applied to the weighing mechanism through means of the support member, and a vertical displacement mechanism, the mechanism including an operating bar passed through the reference weight rest and vertically movable therethrough in such a manner that the reference weight is placed on the end of the operating bar when the bar is located above the weight rest and the reference weight is removed from the end of the operating bar and placed on the weight rest when the bar is moved to a position below the weight rest. The arrangement makes it possible to simplify a span adjustment, and to perform a more accurate span adjustment in a shorter amount of time.

2 Claims, 4 Drawing Figures

SPAN ADJUSTING DEVICE IN AUTOMATIC WEIGHING MACHINE

BACKGROUND OF THE INVENTION

This invention relates to a span adjustment device for adjustment of span weight in an automatic weighing apparatus in which the weight of an object is measured as the output of a displacement sensor. More particularly, the invention relates to a span adjustment device with improved means for applying and removing a weight used for span adjustment.

In general, in an automatic weighing apparatus, articles to be weighed are supplied to a weighing hopper and the total weight including the weight of the hopper is sensed electrically. When the resulting electric signal which is a measure of the weight of the articles has reached a predetermined magnitude, the supply of new articles is stopped and the articles of the desired weight are taken out from the weighing hopper. This operating cycle is repeated for obtaining batches of the articles of the desired overall weight.

FIG. 1 is a top plan view showing such an automatic weighing apparatus, and FIG. 2 shows the same apparatus in side elevation. In this automatic weighing apparatus, a plurality of weighing hoppers 2 are mounted in a circular array above the circumference of the top opening of a collecting chute 1. Each weighing hopper 2 is operatively associated with a weighing mechanism 3 designed to weigh out articles contained in the weighing hopper 2. A distribution table 4 is supported on an electromagnetically operated vibrator 5 for supply troughs 6 and is set into helical reciprocating rotation. The supply troughs 6 are mounted radially on the outer periphery of the distribution table 4 and are vibrated by corresponding electromagnetic vibrators 7. Sensors 8 are used for sensing the quantity of articles left on the distribution table 4 for control purposes. A pool hopper 9 is provided between each weighing hopper 2 and its associated supply trough. Each weighing hopper 2 and the its associated pool hopper 9 are provided with a drive unit 12 and levers 10, 11 adapted for opening and closing the hoppers 2, 9.

The computerized combinatorial weighing apparatus thus constructed operates as follows.

The articles are supplied from the distribution table 4 through supply troughs 6 into pool hoppers 9 and thence into weighing hoppers 2. The articles thus received in the weighing hoppers 2 are weighed by their associated weighing mechanisms 3. Based on the weights measured by the weighing mechanisms 3, a control unit, not shown, of the weighing apparatus performs a combinatorial weighing operation by comparing the result of each combinatorial adding operation performed on the article weights with a preset target weight and selecting the combination of articles, known as the best combination, that gives a total weight equal to the target weight or closest to the target weight. In this case, the number of articles in the combination may be arbitrary or predetermined, as desired. The control unit then operates to open the thus selected weighing hoppers 2 by the operation of the levers 10 so that the articles giving said best combination are released into the collecting chute 1 from the weighing hoppers 2 to be discharged towards a packaging machine or a bucket conveyor, not shown. This will leave the selected weighing hoppers 2 empty. Articles are then newly delivered from the corresponding pool hoppers 9 into said weighing hoppers 2, leaving these pool hoppers 9 empty, whereupon a new supply of articles is delivered from the distribution table 4 and the corresponding supply troughs 6. The weighing operation can be continued in this manner by repeating the foregoing steps.

With continued and prolonged use of the automatic weighing apparatus, however, the weights measured by the apparatus tend to deviate from the true value due to an aberration in so-called span weight (described below) corresponding to the measured weights, or in the zero-point indication. The aberration in in zero point or span weight is caused in turn by some of the articles affixing themselves permanently to the inside of the weighing hoppers, by changes in the weighing mechanisms themselves with time, or by changes in the ambient temperature. The result is a weighing error and diminished weighing accuracy.

The span weight referred to above may be understood from the following discussion. To perform a zero-point adjustment, the weighing hopper of a weighing mechanism is emptied and the indication given by the weighing mechanism is set to zero. Thereafter, the maximum load capable of being weighed by the weighing mechanism is applied. Let this maximum load be 1000 grams. When the load is applied, let us assume that the weighing mechanism indicates a weight of 910 grams. If the weighing mechanism indicates a weight of A grams during an actual weighing operation, therefore, then the true weight $A_t$ of the load will be found from the formula:

$$A_t = (A/910) \times 1000 \text{ grams.}$$

The result of performing the above operation is the span weight.

To eliminate the problem of weighing errors, it is necessary to make frequent periodic adjustment of the span weight and zero point of the weighing apparatus. The span weight adjustment, described briefly above, will now be described in greater detail.

To effect a span adjustment, the weighing hopper of the weighing mechanism is emptied and the gain of the weight sensing circuit is adjusted by regulating a zero-point adjustment dial. Next, with the weighing hopper still empty and with a weight load, corresponding to the span weight, placed on the weighing mechanism, the gain of the weight sensing circuit is adjusted by regulating a span dial. When the span adjustment is made by a manual operation, the above weight load, which will be designated a reference weight for convenience, must be placed on and removed from the weighing mechanism for each adjustment operation. In consideration of the fact that much time and labor may be required for span adjustment especially with an automatic weighing apparatus having a multiplicity of weighing mechanisms, the pesent inventor has filed an application for an automated span adjustment device. In this device, a weight pan is secured directly or indirectly to a weighing hopper and the reference weight is hung above this pan by a pulley and a connecting member such as a string. The other end of the string is connected to the movable core of an electromagnetic solenoid which is supplied with current only during span adjustment to place the reference weight on the weight pan, whereby the reference weight is loaded on the weighing hopper.

In this prior-art device, however, part of the weight of the connecting member is loaded on the pan in addition to the reference weight, because the connecting member such as the string is connected to the reference weight. This may give rise to an inaccuracy in the span adjustment. When a slender connecting member of low weight is used, the connecting member stretches with prolonged use and may contact the pan even when the current is not actually supplied to the solenoid. The connecting member may also break.

SUMMARY OF THE INVENTION

Accordingly, it is an object of the present invention to provide a span adjusting device in an automatic weighing apparatus wherein a reference weight may be applied to and removed from the weight pan automatically.

It is another object of the present invention to provide a span adjusting device in an automatic weighing apparatus wherein a reference weight may be applied to and removed from the weight pan in a quick and easy manner.

It is another object of the present invention to provide a span adjusting device in an automatic weighing apparatus wherein a reference weight may be applied to and removed from the weight pan in accurate fashion.

It is yet another object of the present invention to provide a span adjusting device in an automatic weighing apparatus wherein a connecting member does not prove to be a hindrance to the span adjustment operation.

According to the present invention, these and other objects are attained by providing a span adjusting device for an automatic weighing apparatus of the type in which the load of a weighing hopper containing articles to be weighed is applied to a corresponding weighing mechanism through means of a support member adapted for supporting the weighing hopper, and in which the weight is derived as the magnitude of the output signal from a displacement sensor provided on the weighing mechanism. The span adjusting device comprises a reference weight rest which is secured to the support member and on which a reference weight may be placed so that the span weight of the reference weight is applied to the weighing mechanism through means of the support member, and a vertical displacement mechanism, the mechanism including an operating bar passed through the reference weight rest and vertically movable therethrough in such a manner that the reference weight is placed on the end of the operating bar when the bar is located above the weight rest and the reference weight is removed from the end of the operating bar and placed on the weight rest when the bar is moved to a position below the weight rest. The arrangement makes it possible to simplify a span adjustment, and to perform a more accurate span adjustment in a shorted amount of time.

Other features and advantages of the invention will be apparent from the following description taken in connection with the accompanying drawings.

DESCRIPTION OF THE PREFERRED EMBODIMENT

Figure 3:
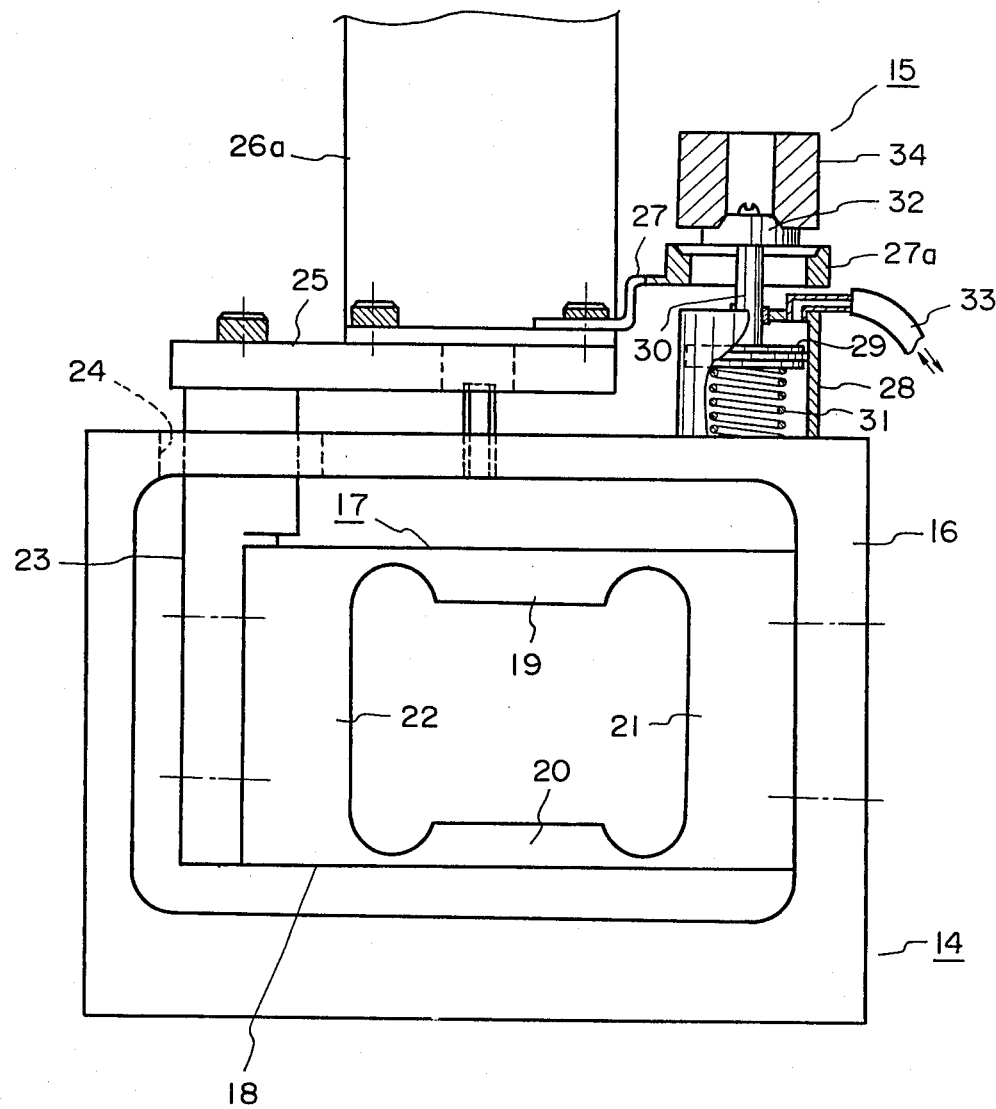
FIG. 3 is a front view showing an embodiment of the span adjusting device of the present invention.
Figure 4:
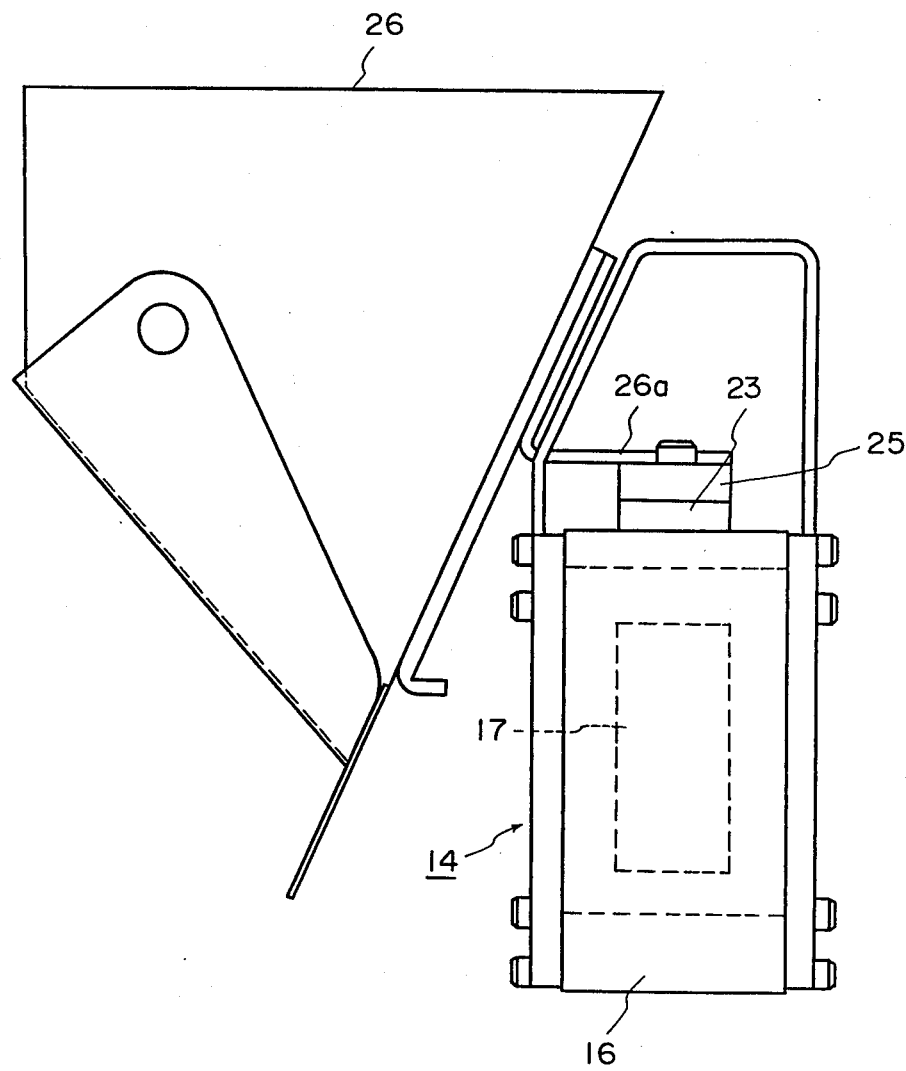
FIG. 4 is a side elevation of the device shown in FIG. 3.

A preferred embodiment of the invention will now be described in further detail. FIG. 3 is a front view showing a span adjusting device according to the invention, and FIG. 4 is a side elevation of the device shown in FIG. 3.

In the drawings, numeral 14 designates a weighing mechanism and numeral 15 a span adjusting device. Numeral 16 designates a rectangular support frame for the weighing machine, adapted for supporting a load cell. Numeral 17 designates a load cell having one side thereof bolted or otherwise fastened to one inner face of the support frame 16. A strain gauge, not shown, is mounted on the outer face of upper and lower beams 19, 20 of a rectangular main element 18 of the load cell. The load cell 17 is bolted or other otherwise secured at a base side 21 to the lateral side of the support frame 16 and is free at the beams 19,20 and at a load receiving portion 22. Numeral 23 designates an upright column secured to the load receiving portion 22 on the other side of the load cell 17, and numeral 25 a bracket screwed or otherwise secured to the upper side of the column 23 which is passed through an opening 24 in an upper side of the support frame 16.

The weighing mechanism is constituted by the above elements. Numeral 26 (FIG. 4) designates a weighing hopper in which articles to be weighed are received and which has a mounting metallic fitting 26a secured as by screws to the bracket 25 for load transmission from the hopper to the bracket 25. A weight rest 27 having a receiving end ring 27a is secured by screws to the bracket 25 together with the fitting 26a of the weighing hopper. Numeral 29 designates the piston of an upright pneumatic cylinder or similar vertical displacement mechanism 28 which is affixed to the support frame 16. Numeral 30 designates an operating bar which is coupled integrally to the piston 29 and passed through the receiving end ring 27a of the weight rest 27 for vertical movement through the receiving end ring. Numeral 31 designates a compression spring for urging the piston 29 upwardly. Numeral 32 designates a reference weight receiving table secured with screws to the end of the operating bar 30 and having an outside diameter sufficient for passage through the end ring 27a. Numeral 33 denotes an air pipe for supply and discharge of compressed air to and from the vertical displacement mechanism 28. Numeral 34 designates a reference weight which is received on the receiving table 32 at the end of the bar operating bar 30 when the bar 30 of the cylinder 28 is in the upper position as shown in the drawing, and which separates from the weight receiving table 32 to be placed on the weight rest 27 when the bar 30 is moved downward under the influence of compressed air introduced into the cylinder of the vertical displacement mechanism 28.

The device described and illustrated above operates as follows.

When the weighing hopper 26 is empty, having not yet been supplied with articles, a zero point adjustment dial, not shown, is operated so that the output from the strain gauge secured to the outer sides of the upper and lower beams 19, 20 of the load cell 17 provides a zero-point reference output. In this manner, the zero point gain of the weight sensing circuit is adjusted to complete the zero point adjustment. At this time, the reference weight 34 has not yet been placed on the end ring 27a of the weight rest 27, but is resting upon the table 32, as shown. Then, with the weighing hopper 26 remaining empty, compressed air is fed into the cylinder of the vertical displacement mechanism 28 to effect the span adjustment. Upon doing so, piston 29 is lowered together with operating bar 30 against the force of the compression spring 31. The reference weight 34 leaves the table 32 at the end of the operating bar and is placed on the receiving end ring 27a of the weight rest 27. A span adjustment mechanism such as a span dial is regulated so that the output obtained at this time from the strain gauge of the load cell 17 is converted into a predetermined output corresponding to the weight of the reference weight 34. With the weight sensing circuit gain thus adjusted at the span weight, span adjustment is completed. Compressed air is discharged from the air pipe 33 to raise the bar 30 of the displacement mechanism 28 under the force of the compression spring 31. In this manner, the reference weight 34 is picked up from the ring 27a and received on the table 32. Weighing may now be performed as usual.

When it is desired to effect span adjustment for each of a plurality of weighing mechanisms, the latter may be selectively connected to a common operating part by a rotary switch.

The pneumatic cylinder used as the vertical displacement mechanism 28 may be replaced by a hydraulic cylinder, electromagnetic solenoid or any other desired drive means.

Although a load cell has been used in the above embodiment for sensing the displacement caused by the loads, a differential transformer may also be employed as such displacement sensor.

In addition, although a zero point adjustment dial and span adjustment dial have been used in the above embodiment as examples of zero point and span adjustment means, any other adjustment means may be employed within the scope of the invention. It does not matter whether the adjustment means are operated manually or automatically.

Figure 1:
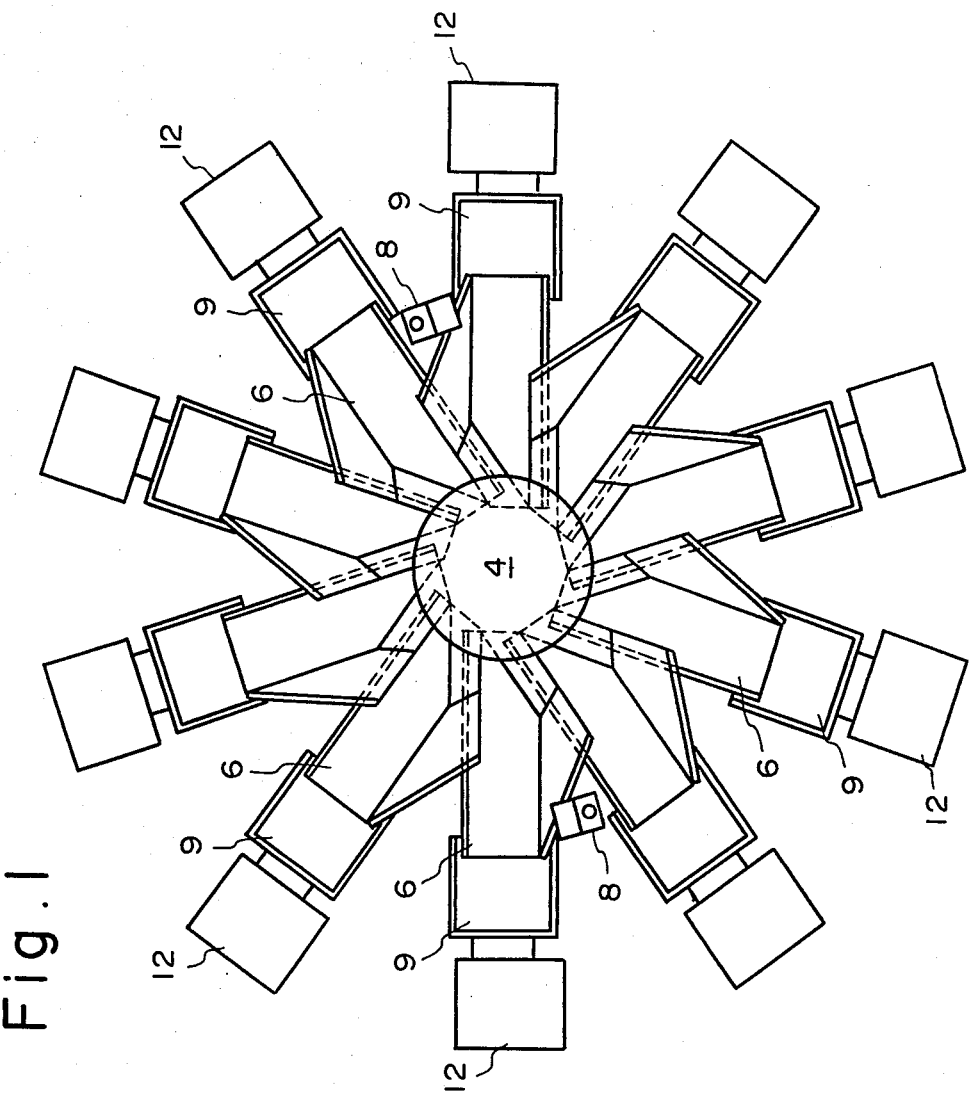
FIG. 1 is a top plan view showing a typical automatic weighing apparatus to which the present invention may be applied.
Figure 2:
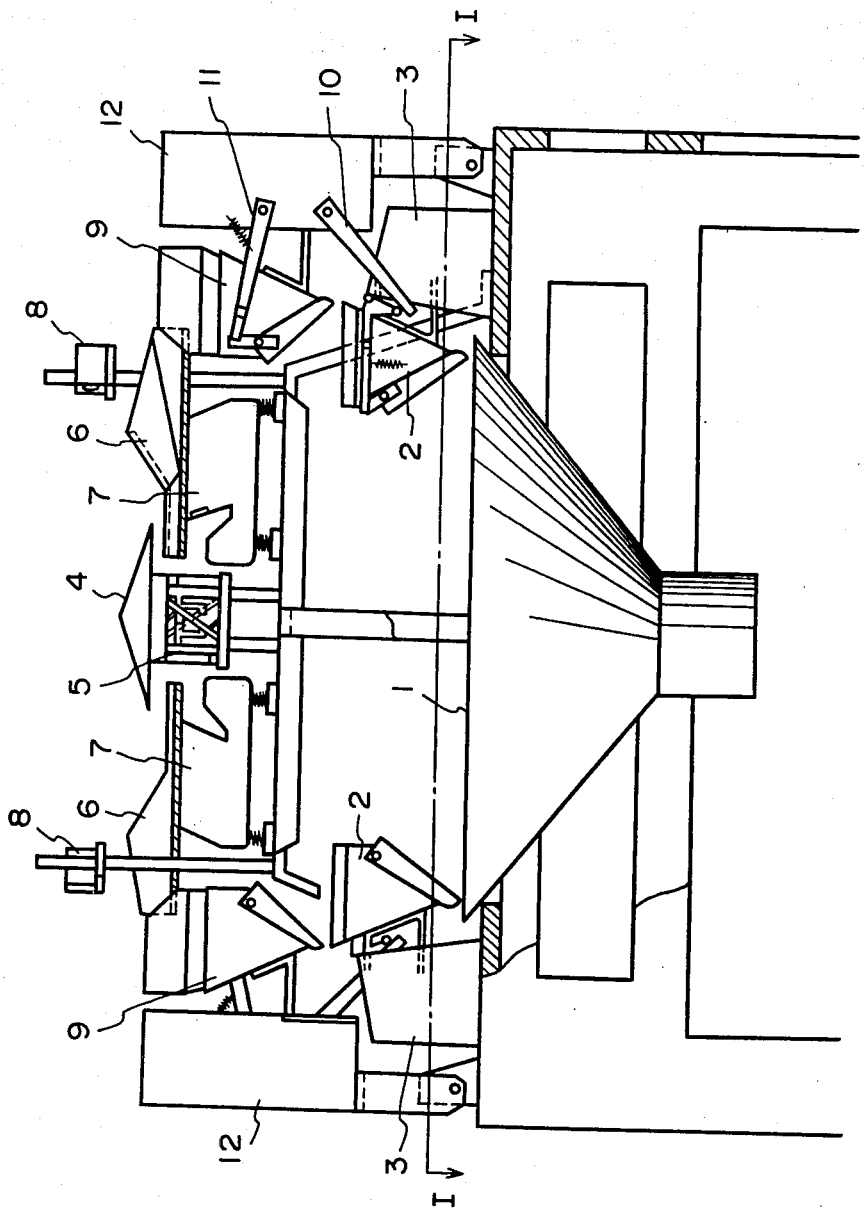
FIG. 2 is a sectional view of the apparatus shown in FIG. 1.

While the span adjustment device of the present invention may be used most effectively in conjunction with computerized combinatorial weighing apparatus or a computer scale having a plurality of weighing hoppers and a micro-computer as a control unit as shown in FIGS. 1 and 2, the present invention can be applied without regard to the number of weighing hoppers or the kind of weighing apparatus.

In accordance with the present invention, span adjustment can be effected easily and promptly and by remote operation by automatically placing the reference weight corresponding to the span weight on the weight pan and removing the reference weight from the pan, whereby the weighing apparatus can be maintained in a condition that assures a high degree of accuracy. Especially in contrast to the conventional device in which the reference weight is applied to or removed from the receiving pan by a connecting member, there are no difficulties caused by elongation or severence of the connecting member, nor is there an error in span adjustment due to the weight of the connecting member. Hence, the weighing apparatus may be operated with the improved reliability required of an automatic weighing apparatus.

Since various changes can be made within the scope of the invention, it is obvious that the present invention is not limited to the details as set forth and may cover any changes as may come within the scope of the following claims.

What is claimed is:

1. In conjunction with an automatic weighing apparatus of the type in which the load of a weighing hopper containing articles to be weighed is applied to a corresponding weighing mechanism through means of a support member adapted for supporting said weighing hopper, and in which the weight is derived as the magnitude of the output signal from a displacement sensor provided on the weighing mechanism, a span adjusting device for performing a span adjustment by loading the weighing mechanism with a reference weight when the span adjustment is carried out, said span adjustment device comprising:

a support frame;
a load cell having one end thereof secured to said support frame;
a support member extending from the other end of said load cell for supporting the weighing hopper;
a weight rest extending from a distal end of said support member;
an end ring attached to a distal end of said weight rest;
a weight receiving table capable of passing through said end ring;
said reference weight which is placed on said weight receiving table at a position remote from said end ring when a weighing operation is performed, and which is placed on said end ring when the span adjustment is performed; and
a single displacement mechanism disposed below said end ring for raising and lowering said weight receiving table.

2. An adjusting device according to claim 1, wherein said single displacement mechanism comprises a cylinder, a piston provided within said cylinder and connected to said weight receiving table, and a compression spring for biasing said piston upwardly, said reference weight being removed from said end ring by the force of said compression spring when a weighing operation is performed.

* * * * *